(12) United States Patent
Van Der Merwe

(10) Patent No.: US 11,861,113 B2
(45) Date of Patent: Jan. 2, 2024

(54) CONTACTLESS TOUCHSCREEN INTERFACE

(71) Applicant: Marthinus Van Der Merwe, Mullaloo (AU)

(72) Inventor: Marthinus Van Der Merwe, Mullaloo (AU)

(*) Notice: Subject to any disclaimer, the term of this patent is extended or adjusted under 35 U.S.C. 154(b) by 117 days.

(21) Appl. No.: 17/756,593

(22) PCT Filed: May 28, 2021

(86) PCT No.: PCT/AU2021/050522
§ 371 (c)(1),
(2) Date: May 27, 2022

(87) PCT Pub. No.: WO2021/237305
PCT Pub. Date: Dec. 2, 2021

(65) Prior Publication Data
US 2023/0004242 A1 Jan. 5, 2023

(30) Foreign Application Priority Data
May 29, 2020 (AU) ................. 2020901767

(51) Int. Cl.
*G06F 3/042* (2006.01)
*G06T 7/73* (2017.01)
*G06F 3/01* (2006.01)

(52) U.S. Cl.
CPC ............ *G06F 3/042* (2013.01); *G06F 3/012* (2013.01); *G06F 3/013* (2013.01); *G06F 3/016* (2013.01);
(Continued)

(58) Field of Classification Search
CPC .......... G06F 3/042; G06F 3/012; G06F 3/013; G06F 3/016; G06F 2203/04108;
(Continued)

(56) References Cited

U.S. PATENT DOCUMENTS 8,760,432 B2  6/2014  Jira et al.
9,612,658 B2  4/2017  Subramanian et al.
(Continued)

FOREIGN PATENT DOCUMENTS

EP  2899611 B1  7/2015

OTHER PUBLICATIONS

International Preliminary Report on Patentability (Chapter II) dated Apr. 14, 2022 from PCT Application No. PCT/AU2021/050522.
(Continued)

*Primary Examiner* — Jonathan A Boyd
(74) *Attorney, Agent, or Firm* — INNOVATION CAPITAL LAW GROUP, LLP; Vic Lin

(57) ABSTRACT

A contactless touchscreen interface has a digital display to display digital information; the proximity detector and a proximity detector comprising an image sensor to detect user interaction at a virtual touch intersection plane offset a distance from the digital display and to resolve the interaction into XY offset-plane interaction coordinates with reference to the digital display. A gaze determining imaging system comprising an image sensor determines a gaze relative offset with respect to the digital display using facial image data captured by the image sensor. An interface controller comprising a parallax adjustment controller to convert the XY offset-plane interaction coordinates to XY on-screen apparent coordinates using the gaze relative offset and the distance and an input controller generates an input at the XY on-screen apparent coordinates accordingly.

14 Claims, 4 Drawing Sheets

(52) U.S. Cl.
CPC ...... *G06T 7/74* (2017.01); *G06F 2203/04108* (2013.01); *G06T 2207/10012* (2013.01); *G06T 2207/30201* (2013.01)

(58) Field of Classification Search
CPC ........... G06F 2203/04101; G06F 3/017; G06F 3/0418; G06F 3/0425; G06F 3/0436; G06F 3/0325; G06F 3/044; G06T 7/74; G06T 2207/10012; G06T 2207/30201; G09F 9/30
See application file for complete search history.

(56) References Cited

U.S. PATENT DOCUMENTS

| | | | | |
|---|---|---|---|---|
| 2011/0041100 | A1* | 2/2011 | Boillot | G06F 3/011 715/863 |
| 2011/0128164 | A1* | 6/2011 | Kang | G01C 21/3664 345/589 |
| 2013/0239041 | A1* | 9/2013 | DaCosta | G06F 3/017 715/773 |
| 2013/0293506 | A1 | 11/2013 | El-Khaled et al. | |
| 2013/0307797 | A1* | 11/2013 | Taguchi | G06F 3/0488 345/173 |
| 2014/0380249 | A1* | 12/2014 | Fleizach | G06F 3/017 715/863 |
| 2015/0022498 | A1 | 1/2015 | Wadia | |
| 2015/0205437 | A1* | 7/2015 | Takahashi | G06F 3/013 345/178 |

OTHER PUBLICATIONS

International Search Report & Written Opinion dated Aug. 24, 2021 from PCT Application No. PCT/AU2021/050522.
International-type search report dated Jul. 13, 2020 from Australia Application No. 2020901767.
Lee, D.S. et al. (2019) Virtual Touch Sensor Using a Depth Camera. Sensors (Basel, Switzerland), 19(4), 885. https://doi.org/10.3390/s19040885 [retrieved from internet: Aug. 19, 2021].
Walker, G. (2011) Camera-based Optical Touch Technology. [retrieved from internet: Aug. 19, 2021].

* cited by examiner

CONTACTLESS TOUCHSCREEN INTERFACE

FIELD OF THE INVENTION

This invention relates generally to touchscreen displays. More particularly, this invention relates to a contactless touchscreen interface used to provide touchscreen interaction without physical contact with a digital display thereof.

SUMMARY OF THE DISCLOSURE

There is provided herein a contactless touchscreen interface comprising a digital display to display digital information. A proximity detector comprising an image sensor detects user interaction at a virtual touch intersection plane offset a distance from the digital display and to resolve the interaction into XY offset-plane interaction coordinates with reference to the digital display.

A gaze determining imaging system comprising an image sensor determines a gaze relative offset with respect to the digital display using facial image data captured by the image sensor.

An interface controller uses a parallax adjustment controller to convert the XY offset-plane interaction coordinates to XY on-screen apparent coordinates using the gaze relative offset and the distance and an input controller generates an input at the XY on-screen apparent coordinates.

As such, the present system may provide a touchless screen interface for a variety of applications, such as ATMs, medical equipment and or the like.

The proximity detector may comprise a plurality of image sensors located around the digital display. These image sensors may be arranged to provide coverage across the entire surface area of the digital display within tight bezel confines despite limited field of view thereof wherein image sensors are located at opposite sides of the digital display and each sensor captures image data from an opposite region of the digital display.

According to a preferred arrangement, the gaze determining imaging system comprises a single image sensor at a top of the bezel, thereby providing an unobstructed view to capture the facial image data and the proximity detector comprises a pair of image sensors close in at either side of the digital display achieving a field of view across the entire surface area thereof despite the space confines of the bezel.

The gaze determining image subsystem may employ facial recognition to determine at least one of a facial centroid and eye location which requires less processing power as would be required for determining eye orientation whilst yet providing reasonably accurate parallax adjustment.

The interface may further comprise a feedback interface comprising a plurality of ultrasonic transducers which emit ultrasound which induces mid-air tactile feedback. The ultrasound transducers may be located around an edge of the digital display and may emit ultrasound in a frequency range of between 20 kHz-60 kHz, preferably approximately 40 kHz. The ultrasound transducers may be orientated in towards the screen and may be recessed beneath an upper surface plane of the screen for flush mount application or alternatively extend above the upper surface plane for enhanced ultrasound transmission.

The ultrasound transducers may be located at opposite sides of the screen so that ultrasound generated thereby coincides substantially in time or correlates in phase from opposite directions at the fingertip. In embodiments, the timing of pulses or phase of the ultrasound transducers at opposite ends of the screen may be controlled according to the XY offset-plane interaction coordinates taking into account the speed of sound so that a focal point coincides with a user's fingertip.

In further embodiments, the feedback interface may emit different ultrasound frequencies for which the phase is controlled to create a standing wave coinciding at the XY offset-plane interaction coordinates.

The interface may comprise an interaction depth indicator indicating to a user whether the user is interacting with the intersection plane wherein the depth indicator may indicate to the user that the user is interacting too close if the proximity detector detects continuous intersection of the intersection plane and indicate to the user that the user is interacting at the appropriate depth if the proximity detector detects intermittent interaction with the virtual touch intersection plane, the depth indicator may indicate to the user that the user is interacting at the appropriate depth.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
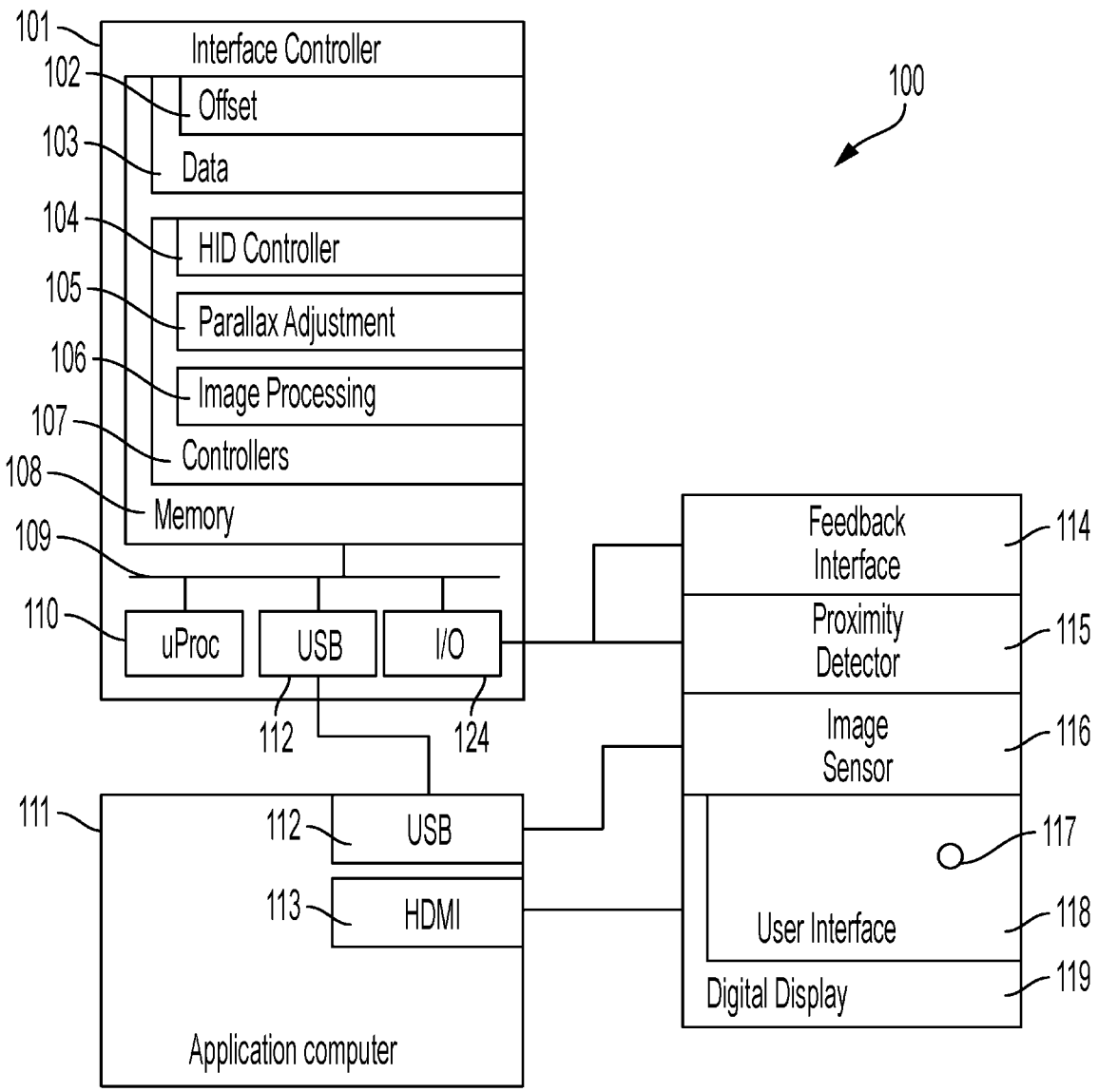
FIG. 1 shows a contactless touchscreen interface in accordance with an embodiment.

A contactless touchscreen interface 100 may comprise an application computer 110 displaying information in a user interface 118 on a digital display 119. The digital display 118 may interface with the application computer 110 via HDMI or similar video interface. The application computer 111 may be for various applications, including ATMs, medical equipment, point-of-sale systems, airline check-in interfaces and the like.

The interface 100 may comprise an interface controller 101 which interfaces with the proximity detector 115 overlaid the digital display 119.

The interface controller 101 comprises a processor 110 for processing digital data. In operable communication with the processor 110 across a system bus 109 is a memory device 108. The memory device 108 is configured for storing digital data including computer program code instructions which may be logically divided into various computer program code controllers 107 and associated data 103. In use, the processor 110 fetches these computer program code instructions from the memory device 108 for interpretation and execution for the implementation of the functionality described herein.

The controllers 107 may comprise an image processing controller 106, parallax adjustment controller 105 and an input device (HRD) controller 104.

The interface controller 101 may comprise an I/O interface 124 for interfacing with the proximity detector 115.

Figure 2:
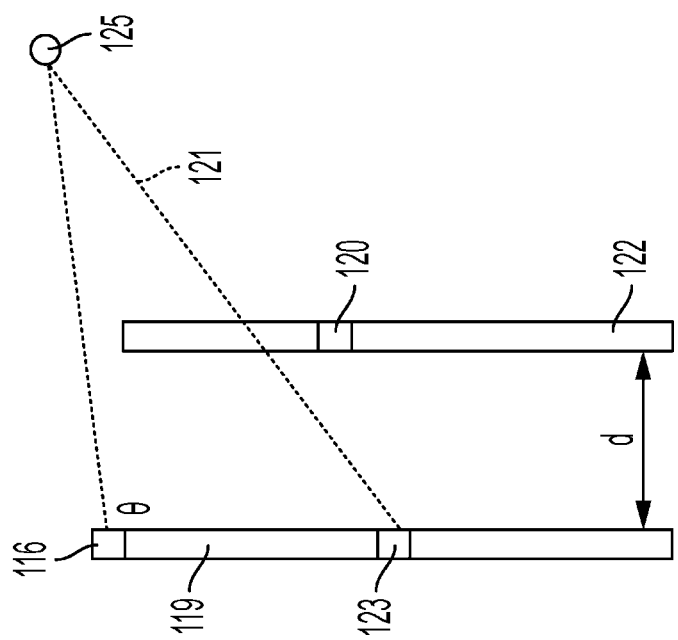
FIG. 2 shows a side elevation view of relative positions of the interface in accordance with an embodiment.

With reference to FIG. 2, the proximity detector 115 detects user interaction at a virtual touch intersection plane 122. The virtual touch intersection plane 122 is set at a distance d from the digital display 119. In embodiments, the distance d may be controlled according to an offset setting 102 within the data 103 of the interface controller 101.

In one form, the proximity detector 115 may take the form of a screen bezel which has light beam interrupt sensors casting an orthogonal arrangement of horizontal and vertical parallel light beams thereacross. The light beams may be infrared. Interruption of an orthogonal pair of light beams is detected by the sensors to determine XY offset-plane interaction coordinates 120 at the XY virtual touch intersection plane 122. If more than two parallel light beams are interrupted, the proximity detector 115 may determine the centre thereof.

In another form, the proximity detector 115 takes the form of a transparent capacitive sensitive overlay configured to detect capacitive coupling of a user's hand or finger when near the capacitive sensitive overlay. The capacitive sensitive overlay may comprise a matrix of transparent conductive plates, each of which acts as a capacitive plate to detect capacitive coupling with a user's hand or finger. The XY offset-plane interaction coordinates 120 may be determined by a region of capacitive plates having greatest capacitive coupling. The capacitive plates may be coupled to an operational amplifier wherein the gain thereof may be used to virtually adjust the distance d from the digital display 119 to the virtual touch intersection plane 122.

In further embodiments the proximity detector 115 may detect proximity using visual sensing using at least one an image sensor 116. The image sensor 116 may capture visible image data of the user's hand in relation to the digital display 119 to determine the relative positioning thereof.

In embodiments, the proximity detector 115 is configured to determine a plurality of relative spatial points (point cloud) lying on contours or extremities of a user's hand or finger to determine the XY offset plane interaction coordinates 120.

For example, the proximity detector 115 may use the image processing controller 106 to map the visual boundaries of the user's hand or finger to determine the plurality of relative spatial points. The most extreme point may be determined therefrom indicative of the position of the user's fingertip.

In embodiments, the image sensor 116 may be a stereoscopic image sensor 116 and wherein the plurality of relative spatial points are determined from differential comparison from stereoscopic image data obtained from the stereoscopic image sensor 116. In accordance with this embodiment, the plurality of relative spatial points may further map the contours of the hand. Using a stereoscopic image sensor 116 may allow the utilisation of a single image sensor 116 to determine the relative position of the user's hand or finger.

Figure 4:
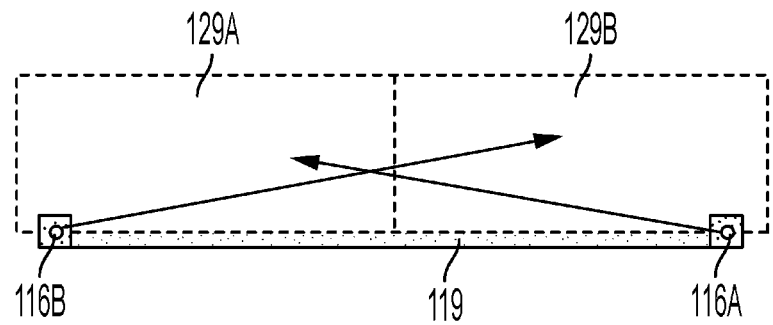
FIG. 4 shows a side elevation view of a digital display of the interface of FIG. 1 in accordance with an embodiment.
Figure 5:
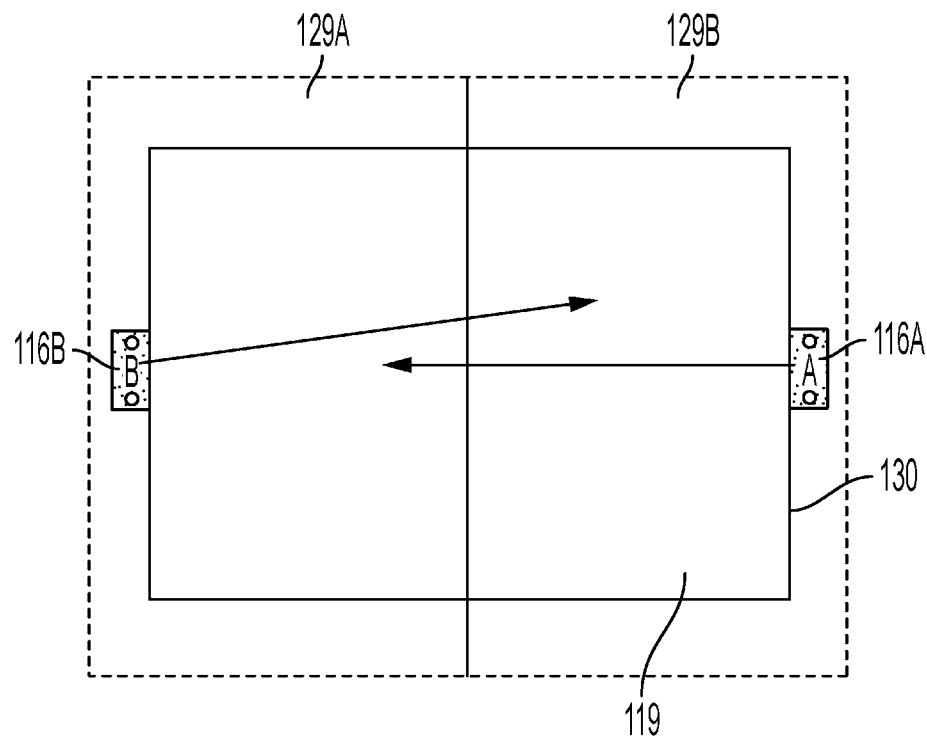
FIG. 5 shows a top plan view of the digital display of FIG. 4.

As shown in FIGS. 4 and 5, the image sensor 116 of the proximity detector 115 may be located right at an edge 130 of the digital display 119. In embodiments, the digital display 119 may be surrounded by a screen bezel and wherein the image sensor 116 is located on or within the bezel.

As is further illustrated in FIGS. 4 and 5, so as to be able to obtain a field of view across the entire surface of the digital display 119, the proximity detector 115 may comprise a plurality of image sensors 116 around the digital display 119.

As is further shown in FIGS. 4 and 5, to account for limited field of view of the image sensors 116 within the confines of the bezel, the image sensors 116 may capture image data from opposite regions 129. For example, the plurality of image sensors 116 may comprise a first image sensor 116A operable to detect interactions at a first region 129A opposite the first image sensor 116A. Furthermore, a second image sensor 116B opposite the first image sensor 116A is operable to detect interactions at a second region 129B of the digital display 119 opposite the second image sensor 116B.

The interface 100 further comprises a gaze determining imaging system to determine a gaze relative offset with respect to the digital display 119. In the embodiment shown in FIG. 1, the gaze determining imaging system comprises an image sensor 116 which captures facial image data of a user's face in front of the digital display 119 and wherein the image processing controller 106 determines the gaze relative offset using the facial image data.

The image processing controller 106 may use facial detection to detect a position of a face within the field of view of the image sensor 116. The relative gaze offset may be calculated in accordance with a centroid of a facial area detected by the image processing controller 106 or, in further embodiments, the image processing controller 106 may further recognise locations of eyes with an official region. The determination of a facial area centroid or locations of the eyes may require less processing power as compared to detecting the actual orientation of the eyes whilst yet providing a relatively accurate parallax adjustment.

The parallax adjustment controller 105 is configured to convert the offset-plane interaction coordinates 120 Xi and Yi to on-screen apparent coordinates 123 Xa and Ya.

In embodiments, the gaze determining image system may comprise an image sensor 116 at a top of the bezel whereas the proximity detector 115 may comprise a pair of image sensors 116 either side of the bezel. The superior location of the gaze determining image system image sensor 116 allows unobstructed view of the user's face to determining the gaze relative offset whereas the side-by-side location of the image sensors 116 of the proximity detector 115 allows for comprehensive coverage of the surface of the display 119 within the confines of a tight bezel therearound.

In other embodiments, the image sensor 116 may be an infrared image sensor to detect a heat signature of the hand to determine the relative positioning thereof. In embodiments, the infrared image sensor 116 may locate behind the digital display 119 to detect infrared through the digital display.

The controllers 107 may comprise a human input device (HID) controller 104 which converts the on-screen apparent coordinates 123 to an HID input via the USB interface 112 or other HID input of the application computer 111. As such, in effect, the HID controller 104 may emulate a mouse input device from the perspective of the application computer 101. As such, the application computer 111 may display a mouse cursor 117 or other interaction indication at the calculated on-screen apparent coordinates 123.

Figure 3:
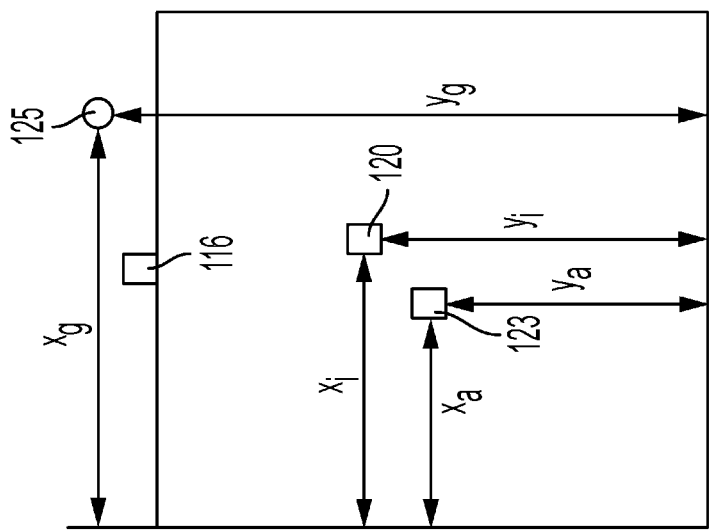
FIG. 3 shows a front elevation view of the relative positions of the interface.

With reference to FIGS. 2 and 3, there is shown the digital display 119 and the virtual touch intersection plane 122 offset a distance d from the digital display 119.

As alluded to above, the distance d may be physically set by the construction of the proximity detector 115 (such as the positioning of the light beam interrupts with respect to the digital display 119) or alternatively virtually adjusted, such as by adjusting the gain of an operational amplifier interfacing the aforedescribed capacitive touch sensitive overlay according to the offset setting 102 of the interface controller 101.

In embodiments, the interface controller 101 may dynamically adjust the offset setting 102. For example, in one manner, for colder temperatures, the interface controller 101 may increase the offset setting 102 to account for when users wear bulkier gloves in cold weather.

In alternative embodiments, the interface controller 101 may dynamically adjust the offset setting 102 according to user specific interactions. For example, using the aforedescribed capacitive touch sensor, the interface controller 101 may detect an offset at which the user prefers to virtually tap the virtual touch intersection plane 122, such as by determining peak values of measured capacitive coupling of the capacitive plates.

For example, some users may inherently prefer to tap the virtual touch intersection plane closer to the digital display 119 as compared to others. As such, in this way, the interface controller 101 dynamically adjusts the positioning of the virtual touch intersection plane according to the specific user behaviour.

FIGS. 2 and 3 show the image sensor 116 capturing image data of the user's face 125 wherein the image processing controller 106 may determine relative angles thereof both in the horizontal and vertical plane. FIG. 3 illustrates these angles being resolved into gaze relative offset Xg and Yg. The gaze relative offsets may be determined with respect to a reference point of the digital display 119, such as a bottom left-hand corner thereof.

Furthermore, FIGS. 2 and 3 show the interaction point coordinates 120 Xi and Yi, being the position at which the user's forefinger intersects the virtual touch intersection plane 122. Where the digital display 119 is in a relatively low position, the interaction point coordinates 120 may be beneath the gaze of the user at the virtual touch intersection plane 122 given that the trajectory of the user's finger and the gaze are nonparallel but coincident at the on-screen apparent coordinates 123. The parallax adjustment controller 105 may adjust the offset between the interaction point coordinates 120 and the on-screen apparent coordinates 123 depending on the angle of the user gaze.

FIGS. 2 and 3 furthermore display on-screen apparent coordinates 123 Xa and Ya calculated by the parallax adjustment controller 105.

In embodiments, the interface 100 comprises a feedback interface 114 to provide feedback when the users forefinger intersects the virtual touch intersection plane 122. The feedback interface 114 may generate an audible output, such as a beep sound every time the user's forefinger intersects the virtual touch intersection plane 122.

Alternatively, the feedback interface 114 may display a pointer indication 117 within the user interface 118 when the user's forefinger intersects the virtual touch intersection plane 122.

In further embodiments, the feedback interface 114 generates haptic feedback.

In embodiment, the feedback interface 140 may comprise a plurality of ultrasonic transducers 128 which emit ultrasound which induces mid-air tactile feedback of the user's finger when intersecting the virtual touch intersection plane 122.

Figure 6:
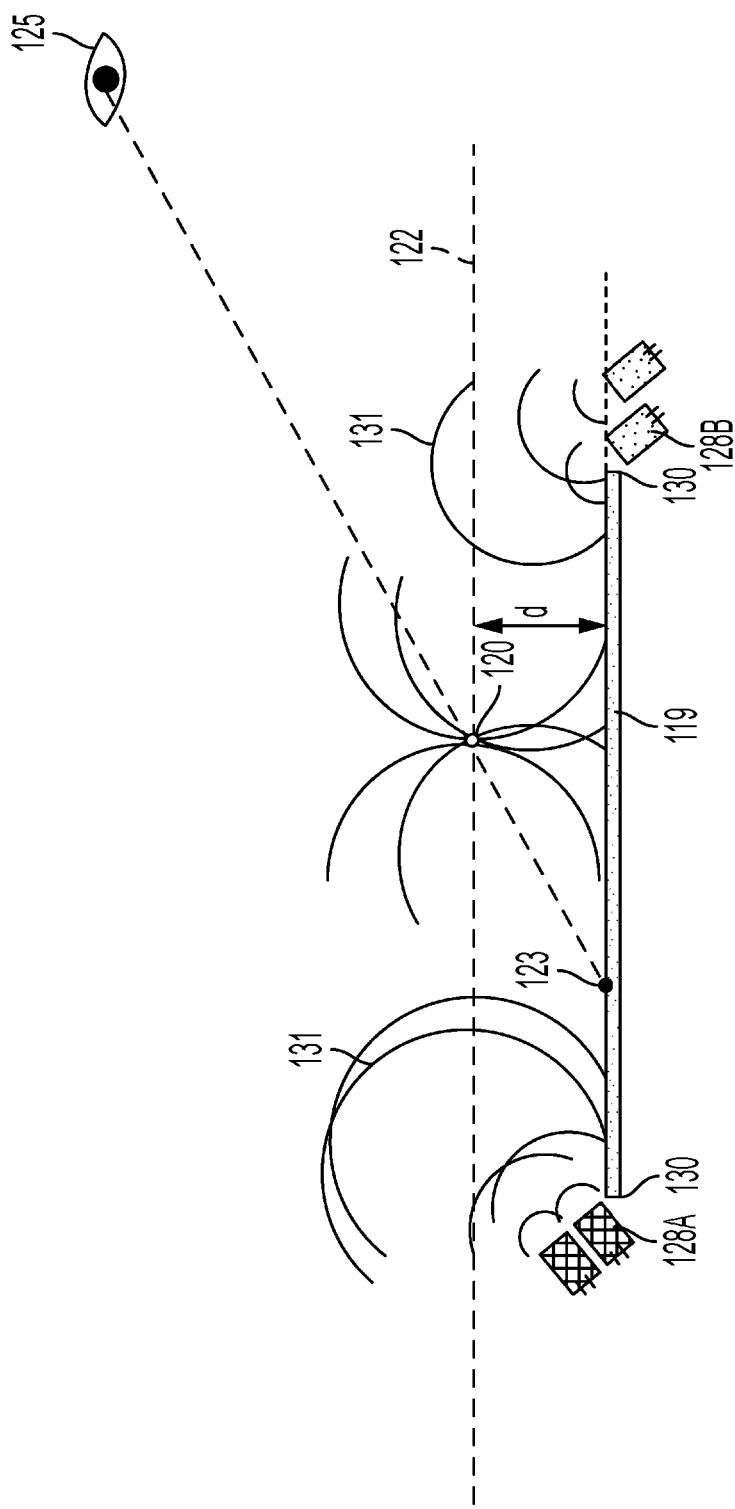
FIG. 6 shows a side elevation view of a digital display of the interface of FIG. 1 in accordance with a further embodiment.

As shown in FIG. 6, the ultrasonic transducers 128 may be located at an edge of the digital display 119. In this regard, the ultrasonic transducers 128 may be located at or within a bezel of the digital display 119.

Furthermore, the ultrasonic transducers 128 may be orientated in towards the digital display 119 to direct ultrasound inwardly.

As shown in FIG. 6, the ultrasonic transducers 128 may comprise ultrasonic transducers 128B which are recessed beneath a surface plane of the digital display 119, being advantageous for flush mounted application.

However, for enhanced ultrasound transmission, the ultrasonic transducers 128 may comprise ultrasonic transducers 128A which extend above the surface plane of the digital display 119.

The ultrasonic transducers 128 may emit ultrasound at between 20 kHz-60 kHz, preferably at approximately 40 kHz.

As is further shown in FIG. 6, the ultrasonic transducers 128 may be located at opposite edges of the digital display 119 so that ultrasound admitted thereby coincides from opposite directions.

In embodiments, the feedback interface 114 may control the timing or phase of the operation of the ultrasonic transducers 128 so that ultrasound admitted thereby coincides substantially simultaneously at a focal point at the XY offset-plane interaction coordinates 120.

Specifically, the ultrasonic transducers may comprise a first set of ultrasonic transducers 128A located at a first side of the digital display 119 and a second set of ultrasonic transducers 128B located at an opposite side of the digital display 119. The feedback interface 114 may control the timing of the operation of the transducers 128A and 128B taking into account the speed of sound so that ultrasonic pressure waves 131 generated by the transducers 128 coincide at a focal point at the XY offset-plane interaction coordinates 120. For example, with reference to the orientation of FIG. 6, the first set of ultrasonic transducers 128A on the left would fire just before the ultrasonic transducers 128B on the right so as to coincide simultaneously at the XY offset-plane interaction coordinates 120.

Alternatively, the feedback interface 114 may control the phase of the ultrasound generated by the transducers 128A and 128B so that their maximum amplitudes coincide at the focal point at the XY offset plane interaction corners 120.

In embodiments, the feedback interface 114 controls the frequency of ultrasound generated by the ultrasonic transducers 128 to create a standing wave at the XY offset-plane interaction coordinates 120. For example, the feedback interface 114 may generate a 40 kHz signal and a 60 kHz signal which coincide to generate a standing wave at the XY offset-plane interaction coordinates.

In embodiments, the feedback interface 114 may provide continuous feedback whilst the user's finger penetrates the virtual touch intersection plane 122.

Furthermore, the feedback interface 114 may generate different types of haptic feedback depending on the on-screen gestures. For example, a mouseclick may be signified by a high amplitude ultrasonic pulse whereas a drag gesture may be signified by a continuous train of lower amplitude pulses. Further haptic feedback may be provided to signify key click gestures and the like.

In embodiments, the interface may comprise an interaction depth indicator indicating to a user whether the user is interacting with the intersection plane 122 at an appropriate depth. In accordance with this embodiment, the digital display may comprise a visual indicator, such as one located at a bezel of the digital display which, for example, may display green when the user is interacting at the appropriate depth.

If the proximity detector detects continuous intersection of the intersection plane 122, the depth indicator may indicate to the user that the user is interacting too close. Conversely, if the proximity detector detects intermittent interaction with the virtual touch intersection plane, the depth indicator may indicate to the user that the user is interacting at the appropriate depth.

In embodiments, the interface 100 may utilise a redundant touch interface such as the aforedescribed capacitive touch interface and/or a haptic overlay which detects physical touches on the digital display 119 in the event that the proximity detector 115 is non-functional or wherein the redundant touch interface is used in combination with the detection of approximately detector 115.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A contactless touchscreen interface comprising:
a digital display to display digital information;
a proximity detector comprising a plurality of image sensors located adjacent an edge of the digital display to detect user interaction at a virtual touch intersection plane offset a distance from the digital display and to resolve the interaction into XY offset-plane interaction coordinates with reference to the digital display;
a gaze determining imaging system comprising an image sensor which determines a gaze relative offset with respect to the digital display using facial image data captured by the image sensor;
an interface controller comprising a parallax adjustment controller to convert the XY offset-plane interaction coordinates to XY on-screen apparent coordinates using the gaze relative offset and the distance; and
an input controller to generate an input at the XY on-screen apparent coordinates wherein the plurality of image sensors of the proximity detector comprise first and second image sensors configured to separately ascertain respective opposite regions of the digital display.

2. The interface as claimed in claim 1, wherein the proximity detector is configured to determine a plurality of relative spatial points lying on at least one contours and extremities of user's hand or finger and wherein the XY offset-plane interaction coordinates are determined from the plurality of relative spatial points.

3. The interface as claimed in claim 2, wherein the plurality of image sensors are stereoscopic image sensors and wherein the plurality of relative spatial points are determined from differential comparison of stereoscopic image data obtained from the stereoscopic image sensors.

4. The interface as claimed in claim 1, wherein the interface controller comprises an image processing controller which determines the gaze relative offset using the facial image data using facial detection to detect the position of a face within a field of view of the image sensor.

5. The interface as claimed in claim 4, wherein the image processing controller determines at least one of a facial centroid and eye location using the facial image data.

6. The interface as claimed in claim 1, further comprising a feedback interface comprising a plurality of ultrasonic transducers which emit ultrasound inducing mid-air tactile feedback.

7. The interface as claimed in claim 6, wherein the ultrasonic transducers are located at an edge of the digital display.

8. The interface as claimed in claim 7, wherein the ultrasonic transducers are orientated in towards the digital display.

9. The interface as claimed in claim 8, wherein the ultrasonic transducers are recessed beneath the surface plane of the digital display.

10. The interface as claimed in claim 9, wherein the ultrasonic transducers comprise a first set of ultrasonic transducers located at a first side of the digital display and a second set of ultrasonic transducers located at an opposite side of the digital display and wherein at least one of the timing of the operation and phase of the transducers is adjusted according to the XY offset plane interaction coordinates so that ultrasound from the first and second set of transducers coincides or correlates at the XY offset plane interaction coordinates.

11. The interface as claimed in claim 1, wherein the interface comprises a single image sensor for the gaze determining imaging system at a top of a bezel of the digital display and the proximity detector comprises a pair of image sensors at either side of the bezel.

12. The interface as claimed in claim 1, wherein the feedback interface generates two frequencies of ultrasound using the ultrasonic transducers and controls the phase thereof to create a standing wave at the XY offset-plane interaction coordinates.

13. The interface as claimed in claim 1, wherein the interface comprises an interaction depth indicator indicating to a user whether the user is interacting with the intersection plane wherein the depth indicator indicates to the user that the user is interacting too close if the proximity detector detects continuous intersection of the intersection plane and indicates to the user that the user is interacting at the appropriate depth if the proximity detector detects intermittent interaction with the virtual touch intersection plane.

14. An interface as claimed in claim 1, wherein the interface controller further comprises a HID controller which converts the on-screen apparent coordinates to an HID input for an application computer operably coupled to the interface controller, wherein the HID input is a mouse input and wherein the application computer displays a mouse cursor at the on-screen apparent coordinates.

\* \* \* \* \*